United States Patent [19]
Sakai et al.

[11] Patent Number: 6,016,881
[45] Date of Patent: Jan. 25, 2000

[54] AUTOMATIC STEERING APPARATUS FOR VEHICLES

[75] Inventors: Katsuhiro Sakai; Yasuo Shimizu, both of Wako, Japan

[73] Assignee: Honda Giken Kogyo Kabushiki Kaisha, Tokyo, Japan

[21] Appl. No.: 08/992,338

[22] Filed: Dec. 17, 1997

[30] Foreign Application Priority Data

Dec. 17, 1996 [JP] Japan .................................. 8-336959

[51] Int. Cl.$^7$ ...................................................... B60S 9/00
[52] U.S. Cl. ........................................... 180/204; 180/446
[58] Field of Search ................................... 180/204, 199, 180/200, 201, 202, 203, 446, 443, 168; 701/41, 42, 48, 23–28, 224; 318/587, 568.1, 489, 434; 340/441, 438; 192/13 R; 477/96

[56] References Cited

U.S. PATENT DOCUMENTS

| | | | |
|---|---|---|---|
| 4,735,274 | 4/1988 | Good et al. | 180/204 |
| 4,931,930 | 6/1990 | Shyu et al. | 180/204 |
| 5,492,348 | 2/1996 | Shaw et al. | |
| 5,742,141 | 4/1998 | Czekaj | 180/204 |
| 5,764,015 | 6/1998 | Shimizu et al. | |

FOREIGN PATENT DOCUMENTS 3-74256  3/1991  Japan .
4-55168  2/1992  Japan .

*Primary Examiner*—Douglas C. Butler
*Attorney, Agent, or Firm*—Nakaido, Marmelstein, Murray & Oram LLP

[57] ABSTRACT

An apparatus for preventing a vehicle from deviating from the correct locus of movement thereof when the vehicle travels in a direction opposite to the direction designated by a gear selecting lever during an automatic parking control operation. When automatic parking control operation is started, the wheels are automatically steered on the basis of the relation between the traveling distance of the vehicle and a standard steering angle which is stored in advance in a storage device, and the vehicle is guided automatically to a parking position. When the vehicle, for which the automatic parking control operation has been started from a position O, moves back from a position Q due to the inclination of the road surface, the automatic parking control operation necessarily continues to be carried out unless the forward movement or backward movement of the vehicle is recognized and the vehicle travels to a different position O'. When the forward or backward movements of the vehicle is recognized, and when the vehicle moves back from the position Q, the standard steering angle $\theta$ref is reproduced reversely from the position Q and outputted, whereby the vehicle can be returned to the original position O.

12 Claims, 8 Drawing Sheets

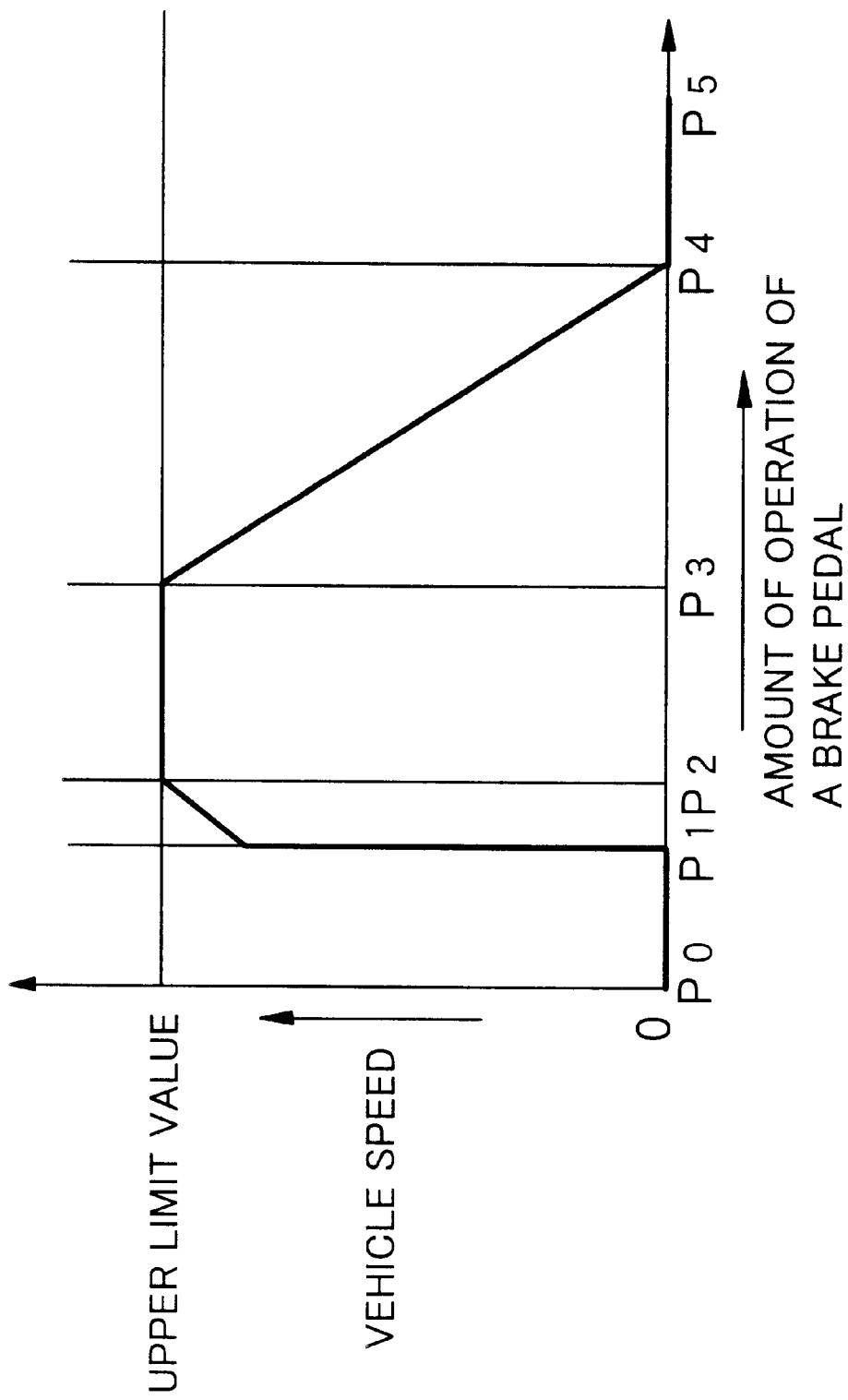

AUTOMATIC STEERING APPARATUS FOR VEHICLES

BACKGROUND OF THE INVENTION

1. Field of the Invention

The present invention relates to an automatic steering apparatus for a vehicle, to automatically park the vehicle without a driver's steering operation.

2. Description of the Prior Art

An automatic steering apparatus is known which utilizes an actuator of a known electrically powered steering apparatus, and is adapted to automatically carry out the back parking and longitudinal parking of a vehicle by controlling the actuator on the basis of the relation between the distance of movement of the vehicle and the steering angle which are stored in advance. Such an apparatus is disclosed in Japanese Patent Application Laid-Open Nos. 3-74256 and 4-55168.

There is a technique of detecting the traveling distance of a vehicle on the basis of the number of rotations of a wheel by using a sensor for sensing the teeth formed at the outer circumferential portion of a disc rotating with the wheel, and determining the number of rotations of the wheel on the basis of pulses obtained by sensing the teeth on the rotating disc. In such a technique, the rotational direction of the wheel (i.e. the traveling direction of the vehicle) cannot be determined. Accordingly, for example, when an automatic parking control is carried out while moving the vehicle forward with the gear selecting lever set in "D" range, and the vehicle moves backward due to the inclination of the road surface, the control unit erroneously judges that the vehicle travels forward, and carries out automatic steering operation since the traveling direction of the vehicle cannot be determined by the conventional technique. Consequently, the locus of movement of the vehicle deviates greatly from a predetermined path.

SUMMARY OF THE INVENTION

The present invention has been developed in view of these facts, and the object of the invention is to prevent the locus of movement of the vehicle from deviating from the proper locus of movement thereof, when the vehicle under automatic parking control travels in a direction opposite to the direction designated by a gear selecting lever.

To achieve this object, according to the present invention, an actual direction of movement of a vehicle is detected by a moving direction detecting means, and the locus of movement of the vehicle is outputted from a storage means on the basis of the detected direction of movement of the vehicle.

In the present invention, the storage means stores the locus of movement of the vehicle as a function of the wheel steering angle with respect to the traveling distance of the vehicle, so that a predetermined locus of movement can be ensured irrespective of the vehicle speed under automatic steering control.

In the present invention, an informing means informs the driver of the fact that the direction of movement of the vehicle detected by a moving direction detecting means is different from that selected by a gear selecting lever, so that the driver can reliably recognize the reverse movement of the vehicle.

In the present invention, a control means stops automatic steering control when the direction of movement of the vehicle detected by the moving direction detecting means is different from that selected by the gear selecting lever. Thus, the driver can choose between the execution of the subsequent parking operation by resuming the automatic steering control or the execution of the subsequent parking by voluntary steering.

In the present invention, a storage means outputs the locus of movement so that the vehicle travels in reverse along the original traveling path when the direction of movement of the vehicle, detected by the moving direction detecting means is different from that selected by the gear selecting lever. Thus, the deviation of the locus of movement of the vehicle from the correct locus of movement thereof can be prevented even when the vehicle under automatic steering control, moves backwards due to the inclination of the road surface.

In the present invention, a control means executes automatic steering control while a braking means is in operation, so that the vehicle can be stopped instantly by the braking means when an obstacle may interfere with the vehicle during the execution of the automatic steering control.

In the present invention, a vehicle speed control means controls the vehicle speed in accordance with the amount of operation of the braking means, so that the control of the vehicle speed can be done easily and reliably even when the road surface has inclination and unevenness.

In the present invention, the vehicle speed increases as the amount of operation of a braking means decreases from a first amount of operation thereof, and decreases as the amount of operation further decreases from a second amount of operation which is smaller than the first amount of operation, so that the controlling of the vehicle speed by the braking means can be done easily.

In the present invention, the upper limit is set for an increase of the vehicle speed occurring when the amount of operation of the braking means decreases from the first amount, so that the occurrence of an increase of not less than a necessary level of the vehicle speed under automatic steering control can be prevented.

In the present invention, the first amount of operation of the braking means is the amount of operation at which the vehicle can be stopped against a creeping force thereof, and the second amount of operation thereof is the amount of operation at which the braking force is not substantially generated. Therefore, when the braking means is operated up to the first amount of operation, the vehicle can be stopped reliably, and, when the braking means is returned to the second amount of operation, the braking force can be released.

In the present invention, the vehicle speed control means sets the vehicle speed at zero when the amount of operation of the braking means is zero, so that, when the automatic steering control finishes and when the amount of operation of the braking means becomes zero, the vehicle can be stopped reliably.

In the present invention, the vehicle speed is set at or near zero until the amount of operation of the braking means reaches a level not lower than the first amount of operation when the vehicle is started under automatic steering control. Therefore, the traveling of the vehicle against the driver's will can be prevented when the braking means is operated, and the vehicle can be made to travel while returning the braking means which has been operated.

BRIEF DESCRIPTION OF THE DRAWINGS

FIG. 4 illustrates the relation between the brake pedal operating amount and the vehicle speed.

DETAILED DESCRIPTION OF THE PREFERRED EMBODIMENT

The mode for carrying out the present invention will now be described by way of an embodiment shown in the accompanying drawings.

Figure 1:
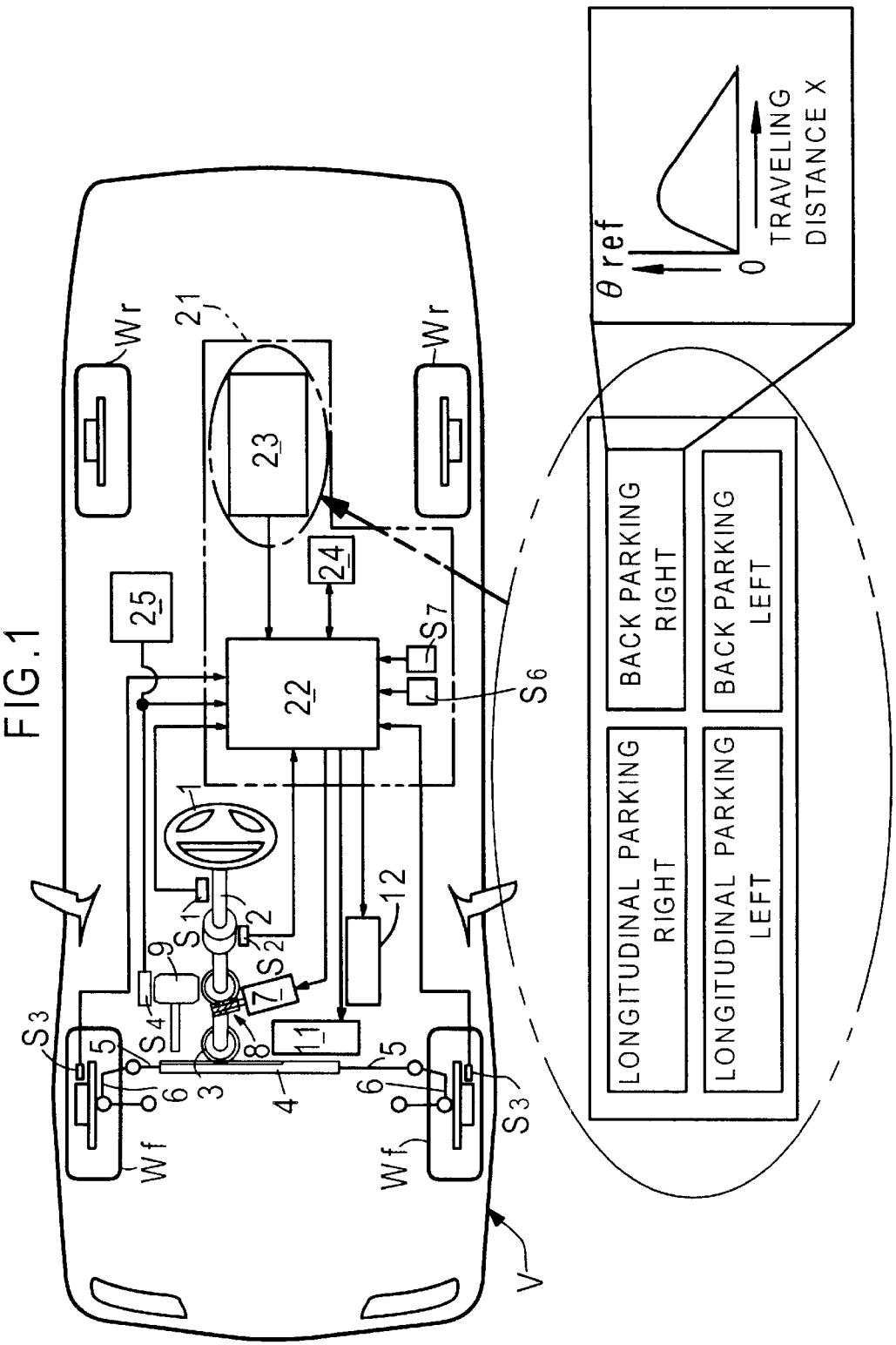
FIG. 1 is a diagram of a vehicle provided with a steering control apparatus of the present invention.

As shown in FIG. 1, a vehicle V is provided with a pair of front wheels Wf, Wf and a pair of rear wheels Wr, Wr. A steering wheel 1 and the front wheels Wf, Wf, which are the steered wheels, are connected together via a steering shaft 2 rotated with the steering wheel 1. A pinion 3 is mounted on a lower end portion of the steering shaft 2, a rack 4 is meshed with the pinion 3, left and right tie rods 5, 5 are provided on the ends of the rack 4, and left and right knuckles 6, 6 are linked to the tie rods 5, 5. To assist the driver in his operating the steering wheel 1, or to carry out automatic steering operation for parking the vehicle, which will be described later, a steering actuator 7 comprising an electric motor is coupled to the steering shaft 2 via a worm gear 8.

A steering control unit 21 comprises a controller 22, a storage means 23 and a moving direction detector 24. The controller 22 is adapted to receive signals from a steering angle detecting means $S_1$ for detecting the steering angle θ of the front wheels Wf, Wf on the basis of the angle of rotation of the steering wheel 1. A detector $S_2$ detects the steering torque of the steering wheel 1, detector means $S_3$, $S_3$ detects the angles of rotation of the left and right front wheels Wf, Wf, a detector means $S_4$ detects the amount of operation of a brake pedal 9, and a shift range detecting means $S_5$ detects the shift range ("D" range, "R" range, "N" range and "P" range) selected by a gear selecting lever 10.

A mode selecting switch $S_6$ operated by the driver, and an automatic parking starting switch $S_7$ are also connected to the controller 22. The mode selecting switch $S_6$ is operated for selecting one of four parking modes, i.e. a back parking/right mode, a back parking/left mode, a longitudinal parking/right mode and a longitudinal parking/left mode. The automatic parking starting switch $S_7$ is operated when automatic parking operation is started in any mode selected by the mode selecting switch $S_6$.

In the storage means 23, the data on the four parking modes, i.e. the relation between the traveling distance X of the vehicle V and a standard steering angle θref, is stored as a table, in advance. The traveling distance X of the vehicle V is determined by multiplying the already-known circumferential length of the front wheel Wf by the angle of rotation of the front wheel Wf, calculated on the basis of the outputs from the front wheel rotational angle detecting means $S_3$, $S_3$. To calculate the traveling distance X, a high selected value, a low selected value or an average value of two values calculated on the basis of the outputs from the left and right front wheel rotational angle detecting means $S_3$, $S_3$, is used.

Figure 2:
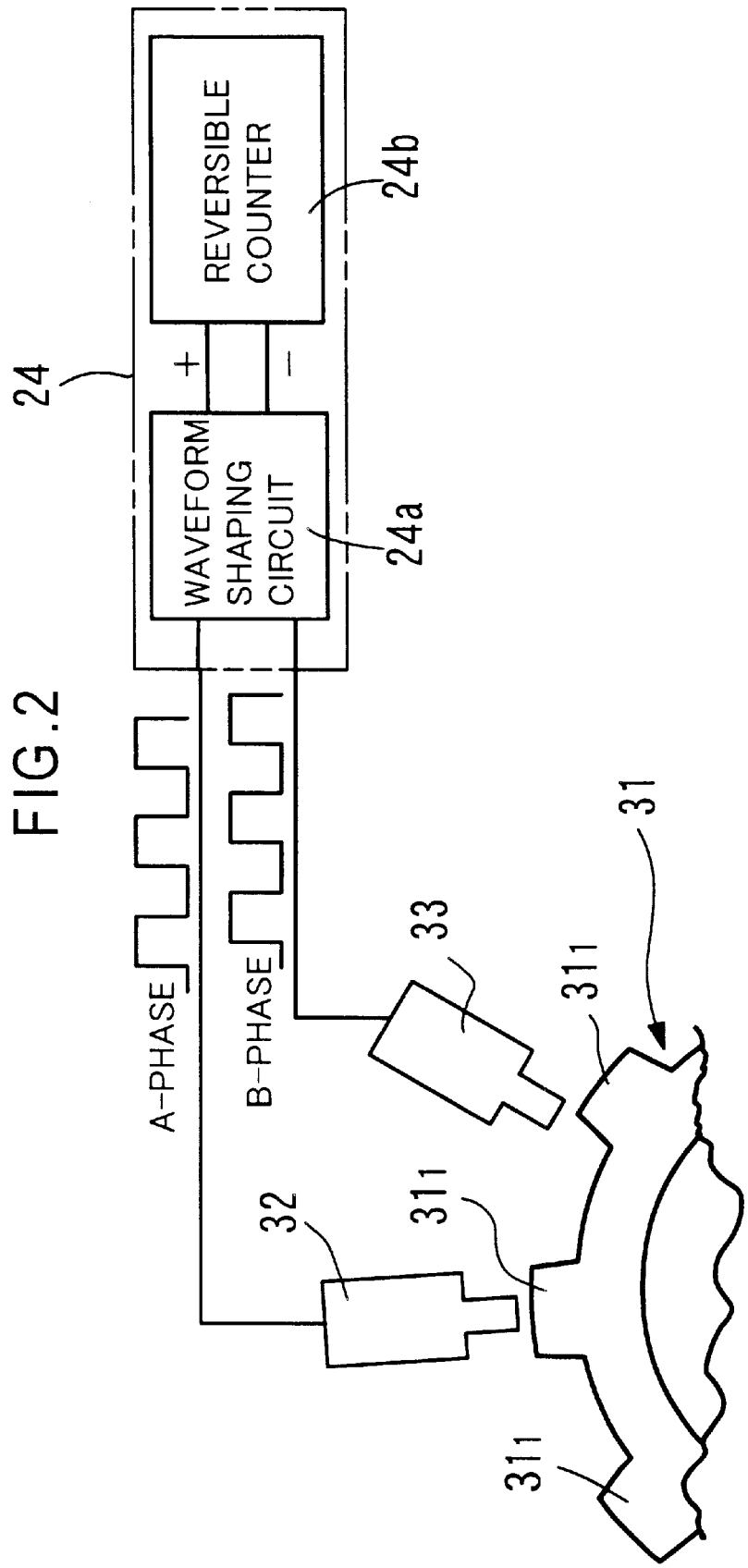
FIG. 2 is an explanatory drawing of a method of detecting the traveling direction of a vehicle.

The moving direction detector 24 is adapted to detect the rotational direction of the front wheels Wf, Wf on the basis of the outputs from the front wheel rotational angle detecting means $S_3$, $S_3$. As shown in FIG. 2, two detecting elements 32, 33 are positioned to be opposed to detecting projections $31_1$, formed at regular intervals on the periphery of a disc 31 rotating with the front wheel Wf. The detecting elements 32, 33 are adapted to generate pulse signals, the phases of which are shifted by π/2, as the detecting projections $31_1$, pass the detecting elements 32, 33. The pulse signal of A-phase and the pulse signal of B-phase are inputted into a waveform shaping circuit 24a and a reversible counter 24b in the moving direction detector 24, in which the rotational direction (traveling direction of the vehicle) and the number of rotations thereof are detected.

Figure 3:
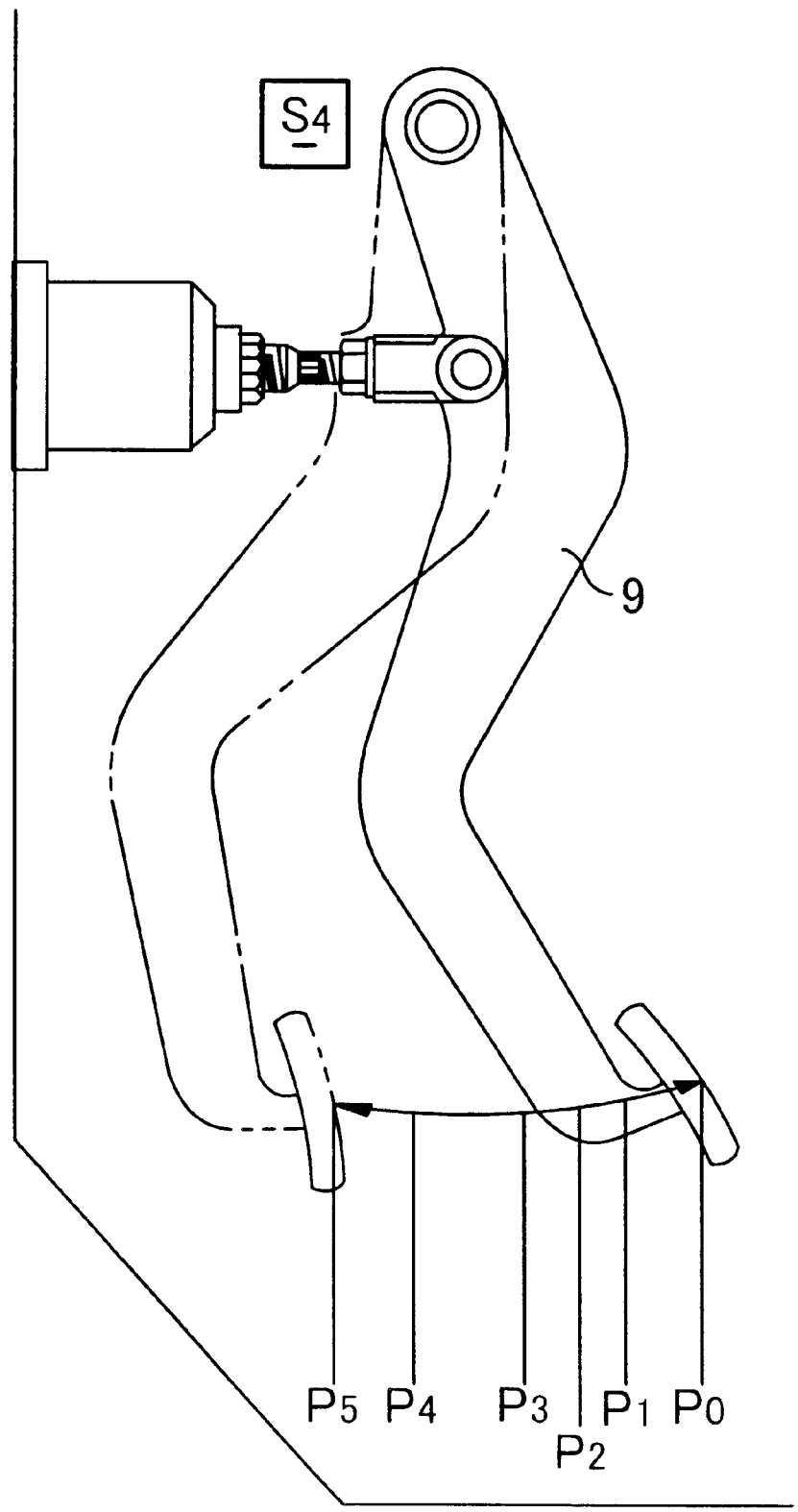
FIG. 3 is an explanatory drawing of the brake pedal operation amount.

The brake pedal operating amount detecting means $S_4$ shown in FIG. 3, is provided on the brake pedal 9 and is adapted to continuously detect the amount of operation between $P_0$ when the brake pedal 9 is not operated and $P_5$ the maximum operation. When the brake pedal 9 is not in operation, the vehicle speed, i.e. the engine output is controlled in accordance with the operation of the accelerator pedal (not shown), while, when the brake pedal 9 is in operation, the vehicle speed is controlled by a vehicle speed controller 25 in accordance with the amount of operation of the brake pedal 9.

FIG. 4 shows the characteristic of vehicle control operation of the vehicle speed controller 25. While the amount of operation of the brake pedal 9 decreases from the maximum level $P_5$ to a level $P_4$, the vehicle speed is set at zero. While the amount of operation decreases from the level $P_4$ to a level $P_3$, the vehicle speed increases linearly from zero to an upper limit level, and, while the amount of operation decreases from the level $P_3$ to a level $P_2$, the vehicle speed is maintained at the upper limit level. While the amount of operation decreases from the level $P_2$ to a level $P_1$, the vehicle speed decreases from the upper limit level to zero, and, while the amount operation decreases from the level $P_1$ to the level $P_0$ at which the brake pedal is not operated, the vehicle speed is set at zero. In the above-mentioned characteristic of the vehicle speed control operation, hysteresis is given. While the amount of operation of the brake pedal increases, the vehicle speed is zero until this amount reaches $P_4$, and, only while the amount of operation decreases from $P_4$, the vehicle speed varies according to the characteristic mentioned above. The vehicle speed while the amount of operation of the brake pedal increases to exceed $P_4$ may be set at a low level (for example, 5 km/h) in the vicinity of zero instead of being set at zero as mentioned above.

The controller 22 is adapted to control the operation of the steering actuator 7 and an operation stage display unit 11 comprising a liquid crystal monitor. The control by controller 22 is on the basis of signals from the detecting means $S_1$–$S_5$ and switches $S_6$, $S_7$, data on the parking modes stored in the storage 23 and the traveling direction of the vehicle judged by the moving direction detector 24. The operation stage display unit 11 comprises an informing means of the present invention, and is provided with a loudspeaker giving a vocal instruction to the driver.

The operation of the embodiment of the present invention having the above-mentioned arrangement will now be described.

In a normal operation (the automatic parking starting switch $S_7$ is not on), i.e., when automatic parking operation is not carried out, the steering control unit 21 functions as a general power steering control unit. When the driver operates the steering wheel 1 so as to turn the vehicle V, the steering torque detecting means $S_2$ detects the steering torque applied to the steering wheel 1, and the controller 22 of the steering control unit 21 drives the steering actuator 7 on the basis of the steering torque. As a result, the left and right front wheels Wf, Wf are steered by the driving force of the steering actuator, whereby the steering operation of the driver is assisted.

The content of automatic parking control operation will now be described taking as an example a back parking/left mode (mode in which the vehicle V is parked in a left-hand parking position as the vehicle is moved backwards.

Figure 5A:
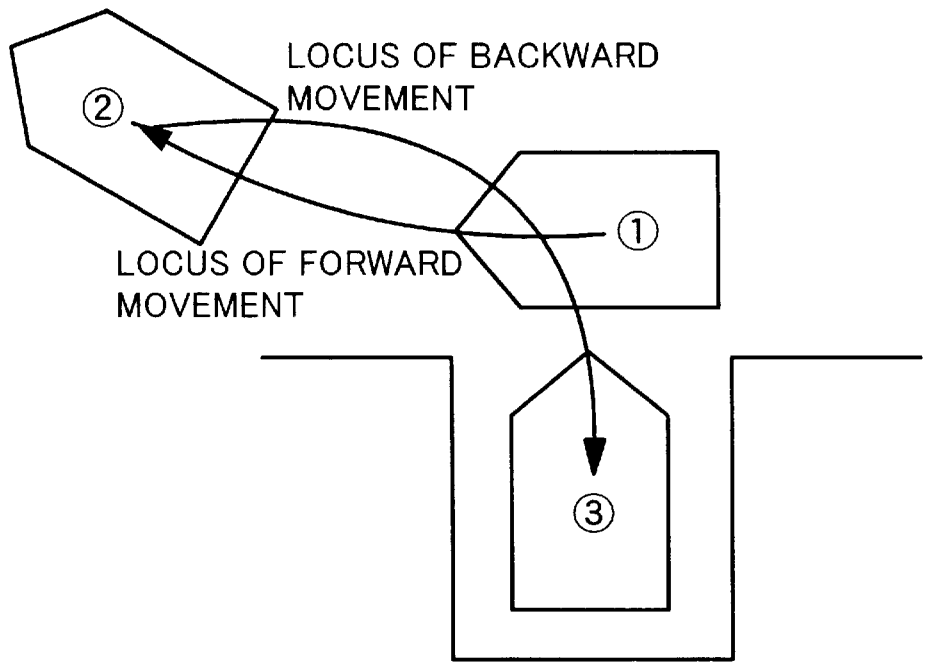
FIGS. 5A and 5B are explanatory drawings of the operation in a back parking/left mode.

First, as shown in FIG. 5A, the vehicle V is moved to a position in the vicinity of a garage in which the vehicle V is to be parked, and stopped in a position (starting position 1) in which a predetermined reference (for example, the left-hand side mirror) is aligned with a center line of the garage with the left side of the vehicle body as close as possible to an entrance line of the garage. Then, when mode selecting switch $S_6$ is operated to select the back parking/left mode and the automatic parking starting switch $S_7$ is operated, automatic parking control operation is started. While the automatic parking control operation is carried out, the actual position of the vehicle, obstacles around the vehicle, parking position, the predicted locus of movement of the vehicle from the starting position to the parking position, and the position in which the forward movement of the vehicle is changed to the backward movement thereof are displayed on the operation stage display unit 11, and various kinds of instruction and alarms are given vocally from a loudspeaker to the driver.

When the driver makes the vehicle V creep as he operates the brake pedal 9 during the automatic parking control operation, the front wheels Wf, Wf are automatically steered on the basis of the data for the back parking/left mode selected by the mode selecting switch $S_6$, even if the driver does not operate the steering wheel 1. Namely, while the vehicle V travels forward from the starting position 1 to the reversing position 2, the front wheels Wf, Wf are steered rightward automatically, and, while the vehicle V travels backward from the reversing position 2 to a parking completion position 3, the front wheels Wf, Wf are steered leftward automatically.

Figure 5B:
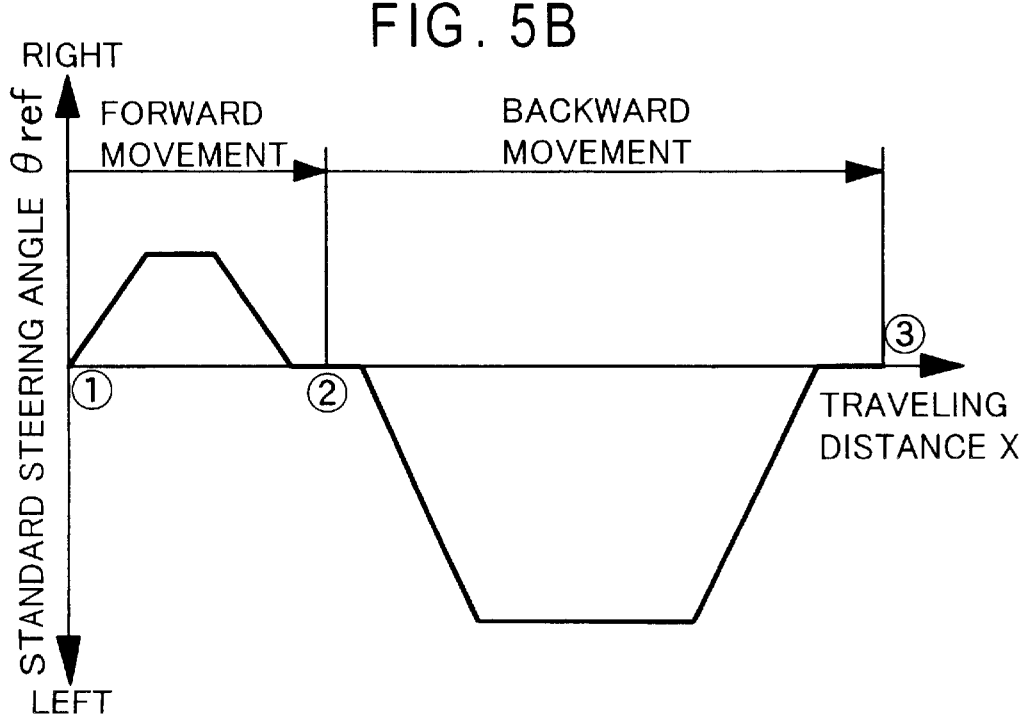

As is clear from FIG. 5B, while the automatic steering operation is carried out, the controller 22 calculates the deviation $E=\theta\text{ref}-\theta$ on the basis of the standard steering angle $\theta\text{ref}$ of the back parking/left mode read from the storage 23 and the steering angle $\theta$ inputted from the steering angle detecting means $S_1$, and controls the operation of the actuator 7 so that the deviation E becomes zero. In this case, since the data on the standard steering angle $\theta\text{ref}$ is set to correspond to the traveling distance X of the vehicle V. The vehicle V always travels along the above-mentioned locus of movement even when the speed of the creeping vehicle varies.

Figure 6:
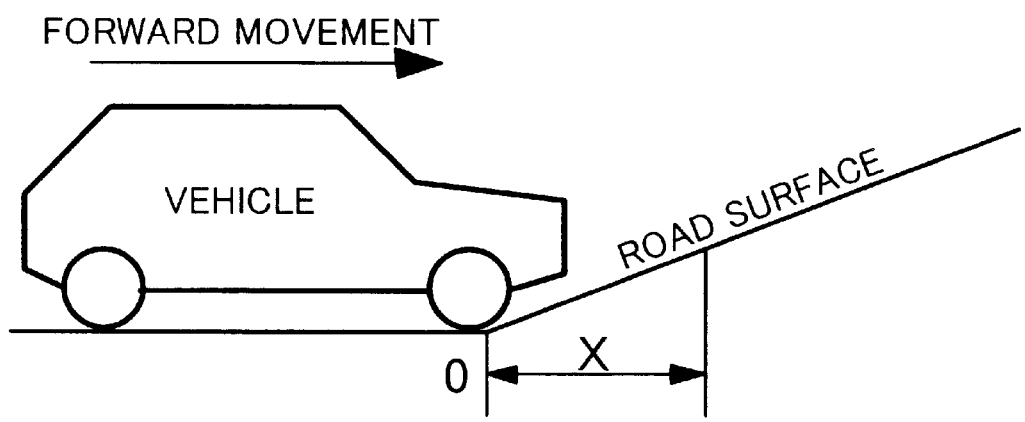
FIG. 6 is an explanatory drawing of a case in which automatic parking control operation is carried out on a slope.

In the section 1→2 in FIG. 5A, the gear selecting lever 10 is operated to the "D" range, and the vehicle V travels forward. In the section 2→3, the gear selecting lever 10 is operated to the "R" range, and the vehicle travels backwards. However, when the road surface in the section 1→2 is a steep ascending slope as shown in FIG. 6, the vehicle may move back from an intermediate point of the section 2→1, through the gear selecting lever 10 is in the "D" range. When the controller 22 judges erroneously at this time that the vehicle V travels forward since the gear selecting lever 10 is operated in the "D" range, the following problem occurs.

Figure 7A:
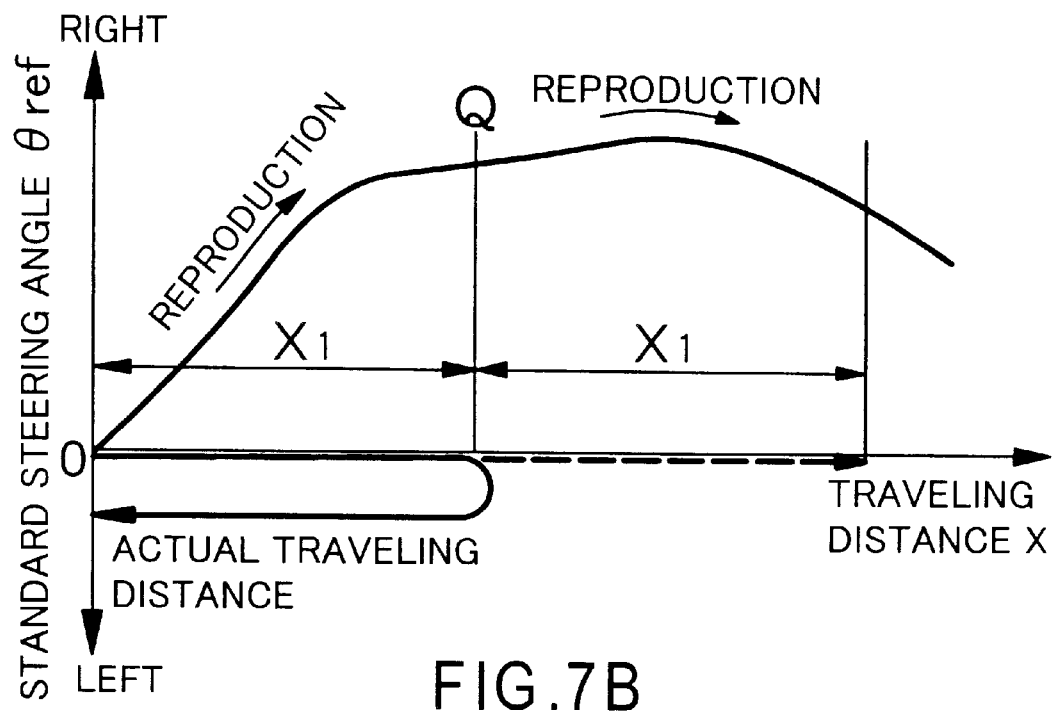
FIGS. 7A and 7B are drawings illustrating the effect in a case where the vehicle moves back under automatic parking control.
Figure 7B:
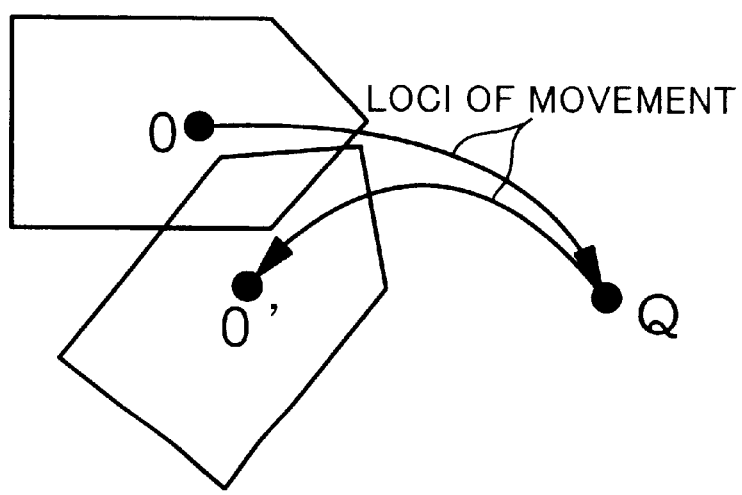

Referring to, for example, FIGS. 7A and 7B, when the vehicle V moves back from a position Q, to which the vehicle V has moved forward from a starting position by a distance $X_1$, to the original starting position, the controller 22 judges erroneously that the vehicle travels forward a distance $2X_1$, and outputs a standard steering angle $\theta\text{ref}$ corresponding to the distance $2X_1$, the controller then carries out the automatic steering operation. As a result, when the vehicle V, which has started from a position O in FIG. 7B, moves back from a position Q, it moves to a quite different position O' and not to the original position O. Therefore, when the automatic parking control operation is carried out again, useless time and labor are required, and, moreover, there is the possibility that an obstacle may interfere with the vehicle V.

Figure 8:
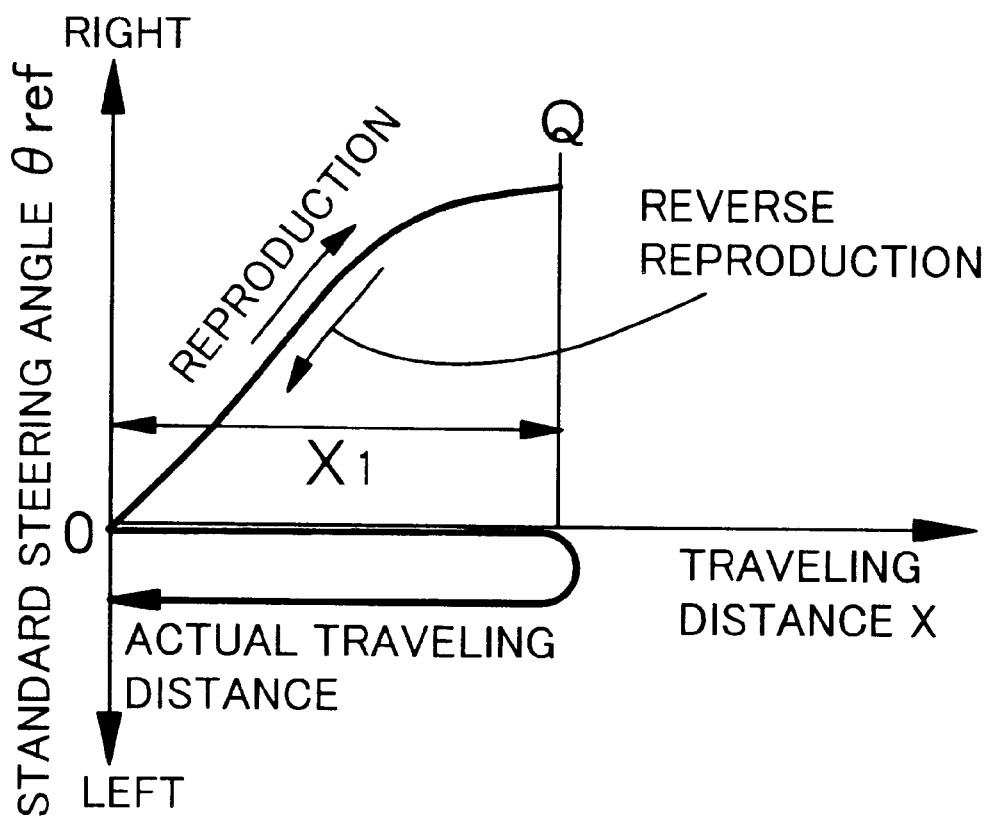
FIG. 8 is a drawing illustrating the operation of the present invention.

However, with the present invention when the moving direction of the vehicle detected by the moving direction detector 24 does not agree with that corresponding to the range selected by the gear selecting lever 10, a stored standard steering angle $\theta\text{ref}$ is reversely reproduced as shown in FIG. 8. Accordingly, when the vehicle V, for which the automatic parking control operation has been started from the position O in, for example, FIG. 7A, moves back from the position Q, it becomes possible that the vehicle returns to the original position O along the same path which the vehicle has moved during its forward movement. Therefore, the automatic parking control operation can be carried out again instantly, and, moreover, there is no possibility that an obstacle will interfere with the reversing vehicle V.

When the moving direction of the vehicle V detected by the moving direction detector 24, becomes different from that corresponding to the range selected by the gear selecting lever 10, the operation stage display unit 11 arouses the driver's attention by informing him through a monitor or vocally, of the fact that the vehicle is traveling in reverse. When the actual moving direction of the vehicle V becomes different from the correct moving direction thereof, the driver may select one of the following steps: stopping the automatic parking control operation and returning the vehicle to the original position C along the same path that has been taken by the vehicle by the continuation of the automatic parking control operation; or steering the vehicle voluntarily by himself.

The above-mentioned automatic parking control operation is carried out while the vehicle V creeps with the brake pedal 9 pressed by the driver. When the road surface has an inclination or unevenness and when the vehicle is made to travel with a constant creeping force, it is difficult for the driver to cause the vehicle V to creep according to his intention, i.e., when the driver separates his foot from the brake pedal 9 so as to depress the accelerator pedal, the automatic parking control operation is interrupted. However, in this embodiment of the present invention, in which the vehicle speed is controlled in accordance with the amount of operation of the brake pedal 9 with the characteristic is shown in FIG. 4, the vehicle V can travel according to the driver's intention by the operation of only the brake pedal 9, even when the road surface has an inclination or unevenness.

This operation will be described with reference to FIG. 4. When the amount of operation of the brake pedal 9 by the driver is greater than $P_4$ (first amount of operation), the vehicle V is stopped, and, when the depressing force applied to the brake pedal 9 is then lessened to decrease the amount of operation to a level lower than $P_4$, the vehicle speed increases linearly to the upper limit level and is then maintained at the upper limit level until the amount of operation reaches $P_2$ (second amount of operation). Accordingly, when the driver adjusts the depressing force applied to the brake pedal 9 to a value in a range between the first amount of operation $P_4$ and the second amount of operation $P_2$, the vehicle V can be moved at an arbitrary speed between zero and the upper limit level, irrespective of the inclination and unevenness of the road surface. When the amount of operation is less than $P_1$, the vehicle V stops. If the vehicle speed is reduced slightly from the upper limit level when the amount of operation is less than $P_2$, the driver can be informed of the fact that the amount of operation is coming close to $P_1$ at which the vehicle V stops. Since the vehicle speed becomes zero when the amount of operation becomes $P_0$ (i.e. zero), the vehicle V can be held in a stopped state reliably when the automatic parking control operation finishes and the driver separates his foot from the brake pedal 9.

While the automatic parking control operation is carried out and the driver depresses the brake pedal 9 to cause the vehicle V to creep, if the driver finds an obstacle, the vehicle can be stopped immediately by further depressing the brake pedal 9.

As described above, according to the present invention, a means for detecting the actual moving direction of the vehicle is provided, and a storage means is adapted to output the locus of movement of the vehicle on the basis of the moving direction of the vehicle detected by the moving direction detecting means, so that the vehicle can be made to travel constantly along the locus irrespective of the moving direction.

According to the present invention, the storage means is adapted to store the locus of movement of the vehicle as the steering angle of the wheels with respect to the traveling distance of the vehicle, so that a predetermined locus of movement can be ensured irrespective of the level of the vehicle speed during the automatic steering control operation.

According to the present invention, the apparatus is provided with an informing means for informing the driver of the fact that the direction of movement of the vehicle detected by the moving direction detecting means is different from that selected by the gear selecting lever, so that it is possible for the driver to reliably recognize the backward movement of the vehicle.

According to the present invention, when the direction of movement of the vehicle detected by the moving direction detecting means is different from that selected by the gear selecting lever, the control means stops the automatic steering control operation, so that the driver can choose between the execution of the parking operation by resuming the automatic steering control and the execution of the parking operation by his voluntary steering.

According to the present invention, when the direction of movement of the vehicle detected by the moving direction detecting means is different from that selected by the gear selecting lever, the storage means outputs the locus of movement so that the vehicle moves back along the original traveling path. The deviation of the locus of movement of the vehicle from the correct locus of movement thereof can thus be prevented even when the vehicle is under automatic steering control and moves back due to the inclination of the road surface. This enables the automatic steering control operation to be resumed easily, and also an obstacle interfering with the vehicle moving back can be avoided.

According to the present invention, the control means executes automatic steering control while the braking means is in operation, so that the vehicle can be stopped instantly when an obstacle is about to interfere with the vehicle during the execution of the automatic steering control operation.

According to the present invention, a vehicle speed control means controls the vehicle speed in accordance with the amount of operation of the braking means, whereby the controlling of the vehicle speed during the automatic steering control operation can be done easily and reliably irrespective of the inclination and unevenness of the road surface.

According to the present invention, the vehicle speed control means is adapted to control the vehicle speed so that the vehicle speed increases as the amount of operation of the braking means decreases from a first amount of operation, and decreases as the amount of operation further decreases from a second amount of operation which is smaller than the first amount of operation, so that the vehicle speed can be easily controlled by the braking means.

According to the present invention, an upper limit value is set for the increase of the vehicle speed occurring when the amount of operation of the braking means decreases from the first amount of operation, so that the occurrence of the increase of not lower than a necessary level of the vehicle speed under automatic steering control can be prevented.

According to the present invention, the first amount of operation of the braking means is the amount of operation at which the vehicle can be stopped against the creeping force thereof, and the second amount of operation thereof is the amount of operation at which substantially no braking force is generated. Therefore, when the braking means is operated up to the first amount of operation, the vehicle can be stopped reliably, and, when the braking means is returned to the second amount of operation, the braking force can be released.

According to the present invention, the vehicle speed control means sets the vehicle speed at zero when the amount of operation of the braking means is zero, so that, when the automatic steering control finishes and the amount of operation of the braking means becomes zero, the vehicle can be stopped reliably.

According to the present invention, the vehicle speed control means sets the vehicle speed at or near zero until the amount of operation of the braking means reaches a level equal to or greater than the first amount of operation when the vehicle is started under automatic steering control. Therefore, the traveling of the vehicle can be prevented when the braking means is operated, and the vehicle can be made to travel while the operation of the braking means returns to zero.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. An automatic steering apparatus for a vehicle, comprising:

a steering actuator that controls a steering angle of the wheels of said vehicle in response to a steering operation performed by a user of said vehicle;

storage means for storing a predetermined locus of movement of the vehicle to a target stopping position;

control means for automatically controlling said steering actuator based upon data stored in said storage means; and actual moving direction detecting means for detecting an actual direction of movement of said vehicle, said actual direction of movement of said vehicle including a direction of vehicle travel opposite to a designated direction of movement of said vehicle selected by a gear selecting lever, wherein said storage means provides an output to said control means of a locus of movement of said vehicle based on the actual direction of movement of said vehicle detected by said moving direction detecting means.

2. An automatic steering apparatus for a vehicle according to claim 1, wherein said storage means stores the locus of movement of the vehicle as a steering angle of the wheels with respect to a distance traveled.

3. An automatic steering apparatus for a vehicle according to claim 1 or 2, movement of said vehicle and further comprising informing means for informing the driver when the actual direction of movement of said vehicle detected by said moving direction detecting means is different from said designated direction selected by said gear selecting lever.

4. An automatic steering apparatus for a vehicle according to claim 1 or 2, wherein said control means stops automatic steering control of said steering actuator when the actual direction of movement of said vehicle detected by said moving direction detecting means is different from said designated direction selected by said gear selecting lever.

5. An automatic steering apparatus for a vehicle according to claim 1 or 2, wherein said storage means outputs the locus of movement such that said vehicle travels in reverse along an original traveling path when the actual direction of movement of said vehicle detected by said moving direction detecting means is different from said designated direction selected by said gear selecting lever.

6. An automatic steering apparatus for a vehicle according to claim 1, further comprising braking means for braking said wheels of said vehicle, wherein said control means executes automatic control of said steering actuator while said braking means is in operation.

7. An automatic steering apparatus for a vehicle according to claim 6, further comprising speed control means for controlling a speed of the vehicle in accordance with an amount of braking executed by said braking means.

8. An automatic steering apparatus for a vehicle according to claim 7, wherein said vehicle speed control means controls said vehicle speed such that said vehicle speed increases as an amount of braking executed by said braking means decreases from a first amount of operation and said vehicle speed decreases as the amount of braking executed by said braking means decreases from a second amount of operation, said second amount of operation being smaller than the first amount of operation.

9. An automatic steering apparatus for a vehicle according to claim 8, wherein an upper limit level is set for the increase of the vehicle speed which occurs when the amount of braking executed by said braking means decreases from the first amount of operation.

10. An automatic steering apparatus for a vehicle according to claim 9, wherein the first amount of operation is the amount of braking at which said vehicle can be stopped against a creeping force thereof, and said second amount of operation is an amount of braking at which no substantial braking force is generated.

11. An automatic steering apparatus for a vehicle according to claim 6, wherein said vehicle speed control means sets the vehicle speed at zero when the amount of braking executed by said braking means is zero.

12. An automatic steering apparatus for a vehicle according to claim 8, wherein said vehicle speed control means sets the vehicle speed at or near zero until the amount of braking executed by said braking means reaches a level equal to or greater than the first amount of operation when the vehicle is started by the automatic steering control operation.

* * * * *